April 9, 1940.  W. T. BRANTLEY  2,196,547
COMBINED CULTIVATOR AND COTTON CHOPPER
Original Filed March 13, 1937    3 Sheets-Sheet 1
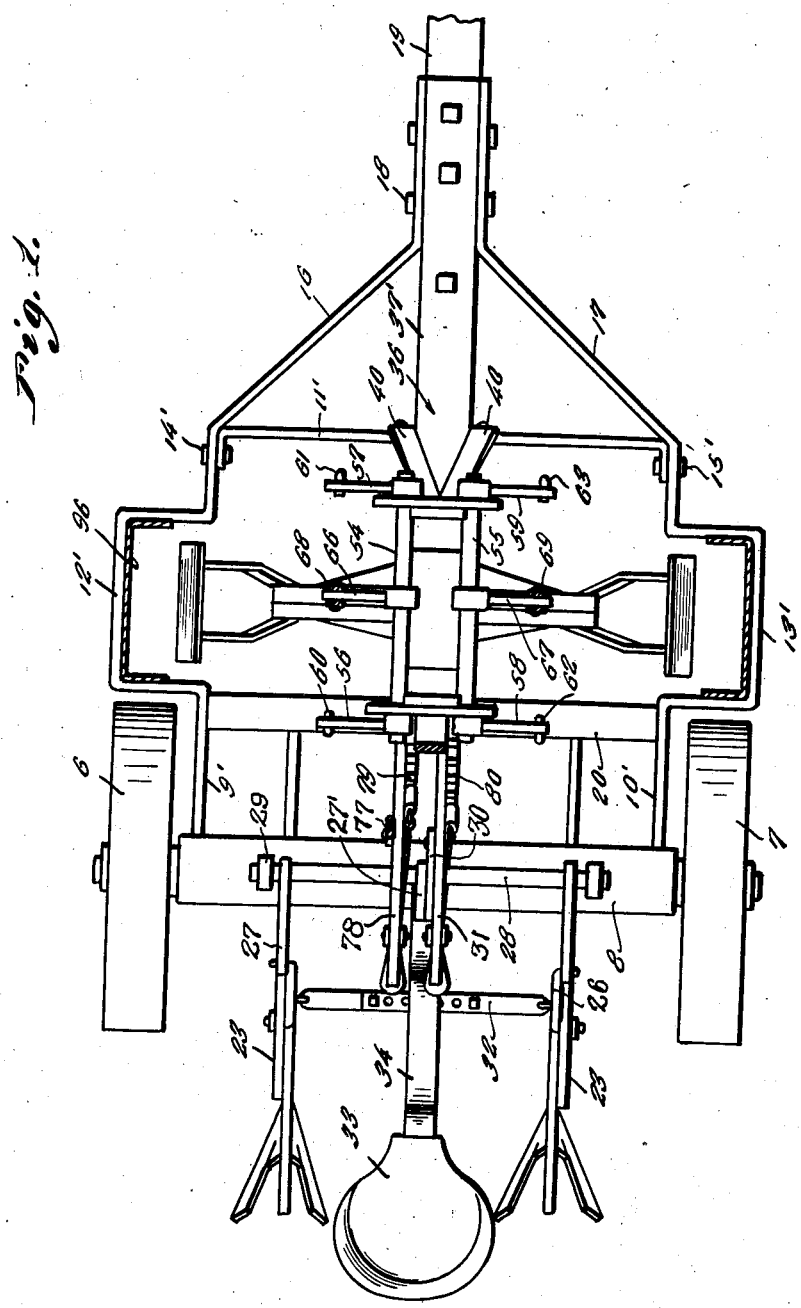
Inventor
*W. T. Brantley*
By *Clarence A. O'Brien*
*Hyman Berman*
Attorneys

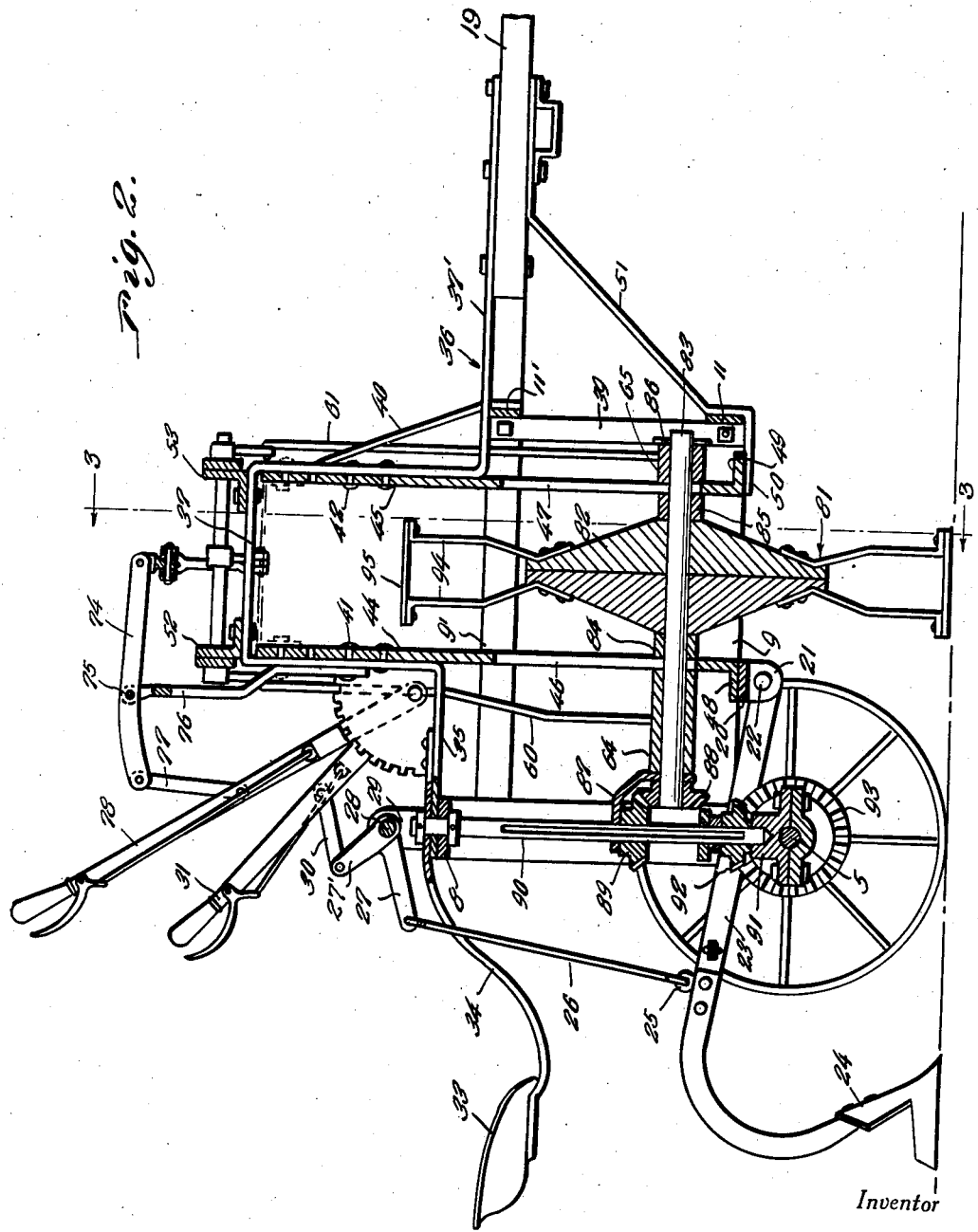

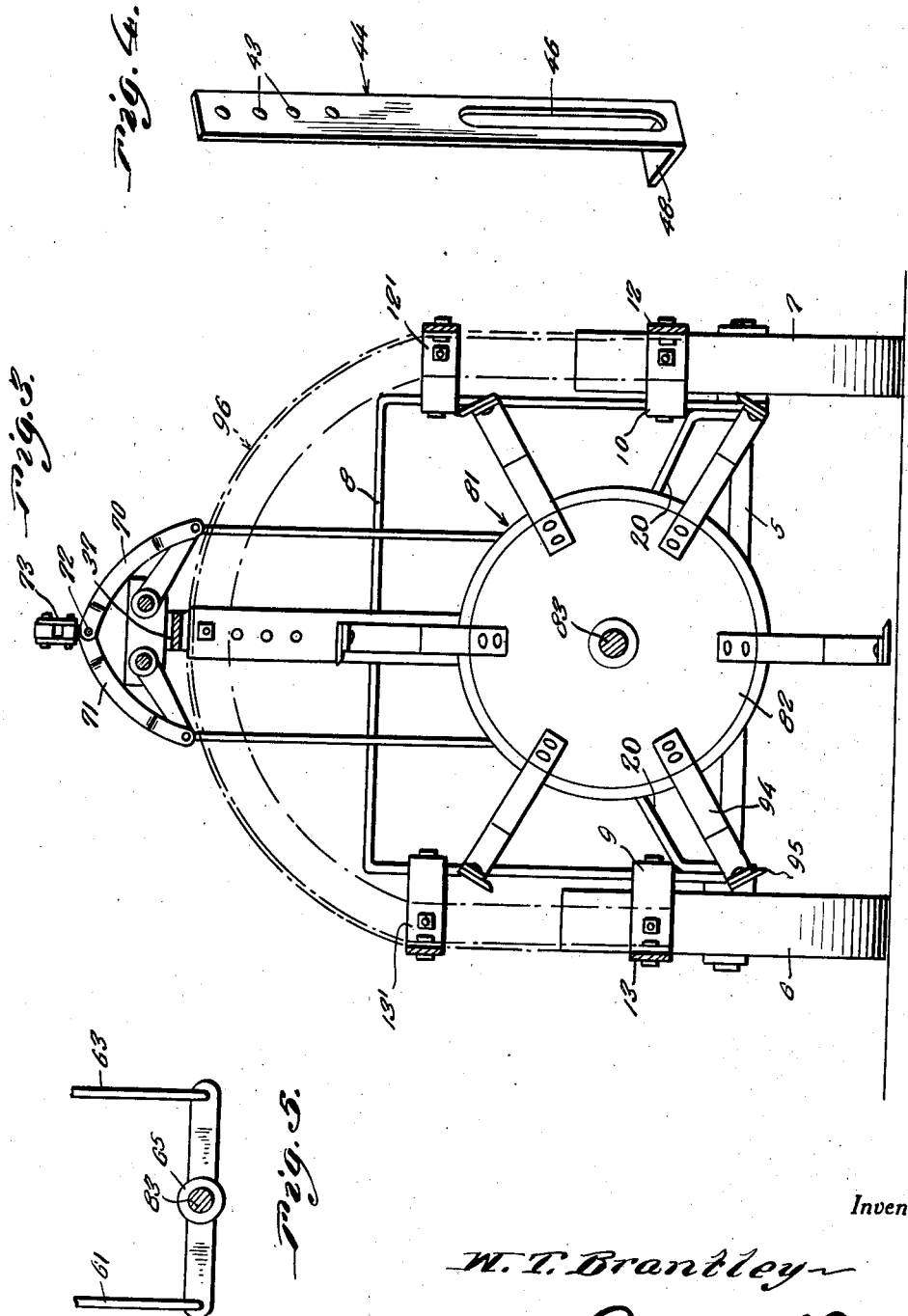

Patented Apr. 9, 1940

2,196,547

UNITED STATES PATENT OFFICE 2,196,547

COMBINED CULTIVATOR AND COTTON CHOPPER

William Taylor Brantley, Broaddus, Tex.

Application March 13, 1937, Serial No. 130,765
Renewed September 19, 1939

1 Claim. (Cl. 97—12)

My invention relates generally to agricultural apparatus, and particularly to a combined cultivator and cotton chopper, and an important object of my invention is to provide a simple, efficient, and labor-saving arrangement of this character.

Other important objects of my invention will be apparent from a reading of the following description taken in connection with the drawings, wherein for purposes of illustration I have shown a preferred embodiment of my invention.

In the drawings:

Figure 1 is a general top plan view of the embodiment with the hood over the hoe-wheel cut away.

Figure 2 is a vertical longitudinal sectional view taken through Figure 1 approximately centrally.

Figure 3 is a transverse vertical sectional view taken substantially on a line 3—3 of Figure 2.

Figure 4 is a perspective view of one of the slide brackets.

Figure 5 is a vertical transverse sectional view of the front support for the hoe-wheel shaft.

Referring in detail to the drawings, the numeral 5 generally designates a transverse axle on the opposite ends of which are mounted the ground-engaging wheels 6 and 7, the wheel 6 being keyed to the axle and the wheel 7 being free to turn on the axle. An inverted U-shaped frame 8 has the lower ends of its legs mounted on the axle while longitudinal side members 9 and 10 extend forwardly from the frame member 8 and are connected at their front ends by a front cross member 11. The side members 9 and 10 have laterally outset portions 12 and 13 as shown in Figure 3 and the forward extremities of the side members 9 and 10 are bolted or riveted to the cross member 11. Upper longitudinal side members 9' and 10' also have outset portions 12' and 13', and diagonal extensions 16 and 17 which are bolted as indicated by the numeral 18 to the opposite sides of the draft pole 19, ahead of the upper transverse cross member 11', the latter being bolted as at 14' and 15' to the members 9' and 10'. The lower longitudinal side members 9 and 10 have connected therebetween forward of the axle the cross member 20 from which depend ears 21 between which are carried stub axles 22 on which the cultivator arms 23 are pivoted. The cultivators are of the break-foot type and include the ground-engaging elements 24, an intermediate pivotal connection being made at the place indicated by the numeral 25 with a depending bar 26 which is pivotally connected to a crank arm 27 which is secured to a rock shaft 28, said shaft being supported in bearings 29 fastened to the top member of the frame 8. A crank arm 27' is also secured to the shaft 28 and is connected by a link 30 to the cultivator elevating lever 31. A link 32 is detachably connected between the cultivators 23 as clearly indicated in Figure 1 of the drawings. A seat 33 supported on a bar 34 is disposed over and between the cultivators and behind the frame 8 and is supported on the top member of the frame 8 and immediately on top of the L-shaped portion 35 of a longitudinal frame member 36 which has an upset portion 37 overriding the cotton chopper hoe-wheel to be described and having a portion 37' extending along and secured to the draft pole 19 as indicated in Figures 1 and 2 of the drawings.

Spacing the upper and lower longitudinal frame members 9' and 9, respectively, are the vertical members 39 which are located immediately adjacent the transverse members 11' and 11, and fastened to and extending in a rearwardly inclined and inwardly converging manner are braces 40 which join the upper cross member 11' and the front leg of the upset portion 37 of the longitudinal frame member 36.

To the front and back legs of the upset portion 37 of the frame member 36 and adjustably attached by means of bolts 41 and 42, respectively, passed through selected ones of the holes 43 are the slide bearings or brackets 44 and 45 which depend below the longitudinal frame member 36 and have vertical slots 46 and 47 formed in the lower part thereof below the member 36. Brackets 44 and 45 have feet 48 and 49 which rest respectively on the cross member 20 and a rearward extension 50 of the inclined brace 51 which extends between the front lower cross member 11 and the underside of the draft pole 19 as shown in Figure 2 of the drawings. The brackets 44 and 45 are vertically adjustable to secure the desired relation to the ground of the chopper and hoe-wheel to be described.

Mounted on the bight portion 37 of the frame member 36 at the front and rear extremities thereof are brackets 52 and 53 which journal the transversely spaced lift shafts 54, 55. The left hand shaft 54 has laterally outwardly directed arms 56 and 57 attached thereto while similarly but oppositely directed arms 58 and 59 on the shaft 55 are provided. From the outer ends of these arms depend vertical links 60, 61 and 62 and 63. The lower ends of the links 60 and 62 are attached to the rear hoe-wheel shaft bearing 64, while the lower ends of the links 61 and 63 are attached to the front hoe-wheel shaft bearing 65.

Means for controllably rotating the shafts 54 and 55 to raise or lower the bearings 64 and 65 comprise arms 66 and 67 projecting oppositely from the shafts 54 and 55 pivoted at their outer ends between furcations 68 and 69 of toggle links 70 and 71 which have their upper ends pivoted together as indicated by the numeral 72 in Figure 3 to a universal joint 73 connected to the front end of a generally horizontal walking beam lever 74 which is pivoted intermediate its ends as indicated by the numeral 75 on a bracket 76 projecting from the rear leg of the upset portion 37 of the longitudinal frame member 36. The walking beam 74 has its rear end pivoted to the upper end of a link 77 whose lower end is pivotally connected intermediate the ends of a hoe-wheel elevation adjusting lever 78. Suitable ratchet and dog arrangements 79 and 80 are provided for the levers 31 and 78 which are mounted alongside each other on the member 35 of the longitudinal frame member 36, so that the levers are in easy reach of the operator when seated upon the seat 33.

The hoe-wheel which is generally designated 81 comprises a circular body 82 of substantially diamond shape in cross section which is suitably keyed to a longitudinally arranged rotary shaft 83 which is slidably mounted in the slots 46 and 47 of the slide brackets 44 and 45. Spacers 84 and 85 space the hoe-wheel body 82 from and between the brackets 44 and 45. The already mentioned bearing 65 is held in place on the shaft 83 by a cotter pin or the like 86, and in front of the bracket 45, while the already mentioned bearing 64 turns on the shaft 83 to the rear of the bracket 44 and has its rear end abutted with a bracket 87 through which the shaft 83 passes at its rear end. The rear end of the shaft 83 has a beveled gear 88 thereon which is in mesh with a beveled gear 89 which is vertically slidable on and keyed to a vertical shaft 90 which traverses also one arm of the bracket 87.

The lower end of the vertical shaft 90 turns in a bearing 91 which is composed of top and bottom sections as shown in Figure 2 of the drawings and embraces the axle 5 on which it is supported with the shaft 5 to rotate relative thereto. The lower part of the shaft 90 has a beveled gear 92 fixed thereto which is in mesh with a beveled gear 93 which is fixed to the rotary axle 5, so that ground motion of the device of the invention will be transmitted by the axle 5 to the shaft 90 and in turn to the hoe-wheel 81, even though the hoe-wheel be in a vertically adjusted position due to the selected positioning of the lever 78.

The hoe-wheel body 82 has extending radially therefrom and from the forward and rear sides thereof pairs of arms 94 which have fastened to the outer ends thereof the hoe-blades 95 which may be of the form illustrated.

It is obvious that by connecting suitable draft means to the draft pole 19 and pulling the device of the invention along the ground, the operator may so adjust the levers 31 and 78 as to procure the desired ground engagement of the cultivators 23 and of the hoe-wheel 81, so that combined operation of chopping cotton and plowing it at the same time are efficiently and economically performed.

A suitable hood 96 arranged over the hoe-wheel 81 may be disposed to fit in the outset portions 12, 12' and 13, 13' of the frame of the device as indicated in dotted lines in Figure 3.

Although I have shown and described herein a preferred embodiment of my invention, it is to be definitely understood that I do not desire to limit the application of the invention thereto, and any change or changes may be made in the materials and in the structure and arrangement of the parts, within the spirit of the invention and the scope of the subjoined claim.

What is claimed as new is:

A cotton chopper of the character described comprising a frame including upper and lower transversely spaced longitudinal frame members connected at their forward ends to a draft pole, an inverted U-shaped frame member connecting the rear ends of said longitudinal frame members, a central longitudinally extending frame member having its front end attached to the draft pole and its rear end attached to said U-shaped frame member, the intermediate portion of said central frame member being upset to provide an inverted U-shaped support, vertical brackets secured at their upper ends to the respective parallel sides of said support, means for securing the lower ends of said brackets to the frame, said brackets having vertically extending slots, ground engaging wheels supporting said first named U-shaped member, an axle rigidly connected to one of said wheels, a vertically extending shaft operatively connected to the axle, a gear slidably mounted on the shaft for rotation therewith, a hoe wheel, a longitudinal shaft on which said hoe wheel is fixedly mounted, said longitudinal shaft being slidably positioned in said slots, a gear on the last named shaft operatively engaged with said slidable gear, cross arms on the front and rear ends of the hoe wheel shaft, rods extending upwardly from the ends of the cross arms, a rock shaft for each rod journaled on the top of said U-shaped support, crank arms connecting the upper ends of the rods to the respective rock shafts, a lever and means operatively connecting the lever to said rock shafts for vertically adjusting the hoe wheel.

WILLIAM T. BRANTLEY.